US010742665B2

(12) United States Patent
Gu et al.

(10) Patent No.: US 10,742,665 B2
(45) Date of Patent: Aug. 11, 2020

(54) SYSTEMS AND METHODS FOR MODIFYING FILE BACKUPS IN RESPONSE TO DETECTING POTENTIAL RANSOMWARE

(71) Applicant: Symantec Corporation, Mountain View, CA (US)

(72) Inventors: Lei Gu, Bedford, MA (US); Ilya Sokolov, Boston, MA (US)

(73) Assignee: NortonLifeLock Inc., Tempe, AZ (US)

( * ) Notice: Subject to any disclaimer, the term of this patent is extended or adjusted under 35 U.S.C. 154(b) by 190 days.

(21) Appl. No.: 15/011,695

(22) Filed: Feb. 1, 2016

(65) Prior Publication Data

US 2017/0223031 A1 Aug. 3, 2017

(51) Int. Cl.
*G06F 17/00* (2019.01)
*H04L 29/06* (2006.01)
(Continued)

(52) U.S. Cl.
CPC .......... *H04L 63/1416* (2013.01); *G06F 3/065* (2013.01); *G06F 3/0623* (2013.01);
(Continued)

(58) Field of Classification Search
CPC .. G06F 21/566; G06F 21/568; G06F 11/1448; G06F 3/0623; G06F 21/56;
(Continued)

(56) References Cited

U.S. PATENT DOCUMENTS 6,611,850 B1 * 8/2003 Shen .................. G06F 11/1448
9,317,686 B1 * 4/2016 Ye ..................... G06F 11/1461
(Continued)

FOREIGN PATENT DOCUMENTS

CN  108701188 A   10/2018
EP  3 411 825 A1  12/2018
(Continued)

OTHER PUBLICATIONS

International Search Report and Written Opinion received for PCT Application Serial No. PCT/US2016/069021 dated Mar. 9, 2017, 9 pages.
(Continued)

*Primary Examiner* — Farid Homayounmehr
*Assistant Examiner* — Lizbeth Torres-Diaz
(74) *Attorney, Agent, or Firm* — FisherBroyles, LLP (57) ABSTRACT

A computer-implemented method for modifying file backups in response to detecting potential ransomware may include (1) detecting, during a file backup process, an anomaly that is potentially indicative of ransomware on a computing device, (2) in response to detecting the anomaly that is potentially indicative of ransomware, storing a backup copy in a separate location from other backup copies, (3) confirming that the anomaly is indicative of ransomware on the computing device, (4) adjusting a backup policy in response to confirming that the anomaly is indicative of ransomware on the computing device, and (5) managing the backup copy based on the adjusted backup policy. Various other methods, systems, and computer-readable media are also disclosed.

20 Claims, 7 Drawing Sheets

(51) Int. Cl.
*G06F 21/56* (2013.01)
*G06F 11/14* (2006.01)
*G06F 3/06* (2006.01)

(52) U.S. Cl.
CPC ........ *G06F 3/0673* (2013.01); *G06F 11/1448* (2013.01); *G06F 21/56* (2013.01); *G06F 21/563* (2013.01); *G06F 21/566* (2013.01); *G06F 21/568* (2013.01); *H04L 63/1425* (2013.01); *H04L 63/20* (2013.01)

(58) Field of Classification Search
CPC ........ G06F 21/565; G06F 3/065; G06F 21/60; G06F 11/1469; H04L 63/1416; H04L 63/20; H04L 63/1425; H04L 63/1433
See application file for complete search history.

(56) References Cited

U.S. PATENT DOCUMENTS

| | | | |
|---|---|---|---|
| 9,665,713 B2* | 5/2017 | Avasarala | G06F 21/56 |
| 2004/0107199 A1* | 6/2004 | Dalrymple, III | G06F 11/1451 |
| 2011/0041004 A1* | 2/2011 | Miwa | G06F 11/1456 |
| | | | 714/5.1 |
| 2011/0082838 A1* | 4/2011 | Niemela | G06F 11/1458 |
| | | | 707/654 |
| 2013/0067576 A1* | 3/2013 | Niemela | G06F 21/568 |
| | | | 726/24 |
| 2013/0254839 A1* | 9/2013 | Sharma | G06F 21/554 |
| | | | 726/1 |
| 2014/0007181 A1* | 1/2014 | Sarin | G06F 21/50 |
| | | | 726/1 |
| 2014/0090061 A1* | 3/2014 | Avasarala | G06F 21/56 |
| | | | 726/24 |
| 2014/0122508 A1* | 5/2014 | Eigner | G06Q 30/0269 |
| | | | 707/752 |
| 2015/0058987 A1* | 2/2015 | Thure | G06F 21/554 |
| | | | 726/23 |
| 2015/0172304 A1* | 6/2015 | Kleczynski | H04L 63/1416 |
| | | | 726/23 |
| 2016/0261608 A1* | 9/2016 | Hu | H04L 63/126 |
| 2016/0267112 A1* | 9/2016 | Clissold | G06F 16/219 |
| 2016/0299934 A1* | 10/2016 | Karandikar | G06F 16/2358 |
| 2017/0032123 A1* | 2/2017 | Carson | G06F 21/6218 |
| 2017/0235953 A1* | 8/2017 | Thadikaran | G06F 21/567 |
| | | | 726/24 |
| 2017/0364681 A1* | 12/2017 | Roguine | G06F 21/554 |

FOREIGN PATENT DOCUMENTS

| | | | | |
|---|---|---|---|---|
| JP | 2009-116773 A | | 5/2009 | |
| JP | 2019-505919 A | | 2/2019 | |
| WO | WO 2017125935 A1 | * | 7/2017 | |
| WO | WO-2017125935 A1 | * | 7/2017 | ............. G06F 11/14 |
| WO | 2017/136073 A1 | | 8/2017 | |

OTHER PUBLICATIONS

International Preliminary Report on Patentability received for PCT Application Serial No. PCT/US2016/069021 dated Aug. 16, 2018, 8 pages.

* cited by examiner

SYSTEMS AND METHODS FOR MODIFYING FILE BACKUPS IN RESPONSE TO DETECTING POTENTIAL RANSOMWARE

BACKGROUND

Ransomware is a specific form of malware that may hold a computing device hostage by preventing access to, or otherwise impeding the normal function of, the device unless a user pays to remove the malware. For example, cryptoviral extortion may accomplish this by encrypting a user's files (using, e.g., a session key) and demanding payment before decrypting the user's files and restoring the user's access to their files.

Security software traditionally attempts to remove malware after it has infected a device and/or attempts to minimize the damage caused during infection. However, due to the large size of keys used in the encryption process of cryptoviral extortion, this form of ransomware may be nearly impossible to overcome after an attack without possession of the encryption key used in the attack. Because of this, some security solutions may create backup copies of files (by, e.g., mirroring existing files on the device) and store them in a separate location in the case of an attack. However, if ransomware is not detected in time, these backup copies may simply mirror the encrypted files and leave the user without a recovery option. Accordingly, the instant disclosure identifies and addresses a need for additional and improved systems for detecting ransomware and managing files in order to prevent the complete loss of files and data due to cryptoviral extortion and other forms of ransomware attacks.

SUMMARY

As will be described in greater detail below, the instant disclosure generally relates to systems and methods for modifying file backups in response to detecting potential ransomware by separating at-risk backup copies and modifying a file backup policy to handle special cases. For example, the disclosed systems may first detect a potential ransomware attack based on anomalous files and processes detected during file backup. The disclosed systems may then adjust the file backup policy to isolate a potentially encrypted backup copy and prevent it from overwriting existing file backups. When a suspected ransomware attack is disconfirmed, these systems may revert to normal backup operations.

In one example, a computer-implemented method for accomplishing the above-described task may include (1) detecting, during a file backup process, an anomaly that is potentially indicative of ransomware on a computing device, (2) in response to detecting the anomaly that is potentially indicative of ransomware, storing a backup copy in a separate location from other backup copies, (3) confirming that the anomaly is indicative of ransomware on the computing device, (4) adjusting a backup policy in response to confirming that the anomaly is indicative of ransomware on the computing device, and (5) managing the backup copy based on the adjusted backup policy.

In some examples, detecting the anomaly that is potentially indicative of ransomware on the computing device may include determining that content of at least one file in the file backup process is anomalous. In these examples, determining that content of the file is anomalous may include determining that content of the file does not match the file's type, determining that the file's header does not match the file's type, and/or determining that the file's entropy is higher than expected. Additionally or alternatively, in other examples, detecting the anomaly that is potentially indicative of ransomware on the computing device may include detecting an anomalous file-modification process on the computing device. In these examples, detecting the anomalous file-modification process may include determining that the usage of a resource by the file-modification process exceeds a predetermined threshold and/or determining that the number of files accessed by the file-modification process is anomalous.

In one embodiment, storing the backup copy in the separate location may include preventing the backup copy from replacing an existing backup copy in the other backup copies. In one example, confirming that the anomaly is indicative of ransomware on the computing device may include identifying ransomware on the computing device, receiving a confirmation of ransomware from antivirus software installed on the computing device, receiving the confirmation of ransomware from a user of the computing device, and/or detecting a ransomware attack on another computing device within a proximity of the computing device. In this example, the proximity of the computing device may include the physical proximity to the computing device and/or a logical grouping of the computing device and the other computing device.

In some embodiments, adjusting the backup policy may include quarantining at least one file in the file backup process. Additionally or alternatively, adjusting the backup policy may include terminating the file backup process. Furthermore, adjusting the backup policy may include adjusting the frequency of the file backup process, adjusting a number of backup copies to retain, and/or adjusting a list of files to backup.

In some examples, managing the backup copy based on the adjusted backup policy may include discarding the backup copy and retaining a safe backup copy. In these examples, managing the backup copy may also include replacing the backup copy with the safe backup copy.

In one example, the computer-implemented method may further include disconfirming that the anomaly is indicative of ransomware on the computing device. This example may additionally include merging the backup copy with the other backup copies.

In one embodiment, a system for implementing the above-described method may include (1) a detection module, stored in memory, that detects, during a file backup process, an anomaly that is potentially indicative of ransomware on a computing device, (2) a storage module, stored in memory, that, in response to detecting the anomaly that is potentially indicative of ransomware, stores a backup copy in a separate location from other backup copies, (3) a confirmation module, stored in memory, that confirms that the anomaly is indicative of ransomware on the computing device, (4) an adjustment module, stored in memory, that adjusts a backup policy in response to confirming that the anomaly is indicative of ransomware on the computing device, and (5) a management module, stored in memory, that manages the backup copy based on the adjusted backup policy. In addition, the system may include at least one physical processor that executes the detection module, the storage module, the confirmation module, the adjustment module, and the management module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect, during a file backup process, an anomaly that is potentially indicative of ransomware on the computing device, (2) in response to detecting the anomaly that is potentially indicative of ransomware, store a backup copy in a separate location from other backup copies, (3) confirm that the anomaly is indicative of ransomware on the computing device, (4) adjust a backup policy in response to confirming that the anomaly is indicative of ransomware on the computing device, and (5) manage the backup copy based on the adjusted backup policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for modifying file backups in response to detecting potential ransomware. As will be explained in greater detail below, by isolating potentially infected files, the systems and methods disclosed herein may provide better management of backup copies to avoid loss of data due to ransomware. For example, by detecting anomalies during the file backup process, the disclosed systems and methods may identify potential ransomware that may compromise those files. The disclosed systems and methods may then modify backup policies to adapt to the potential threat and prevent infected backup copies from replacing unencrypted backup copies.

Figure 1:
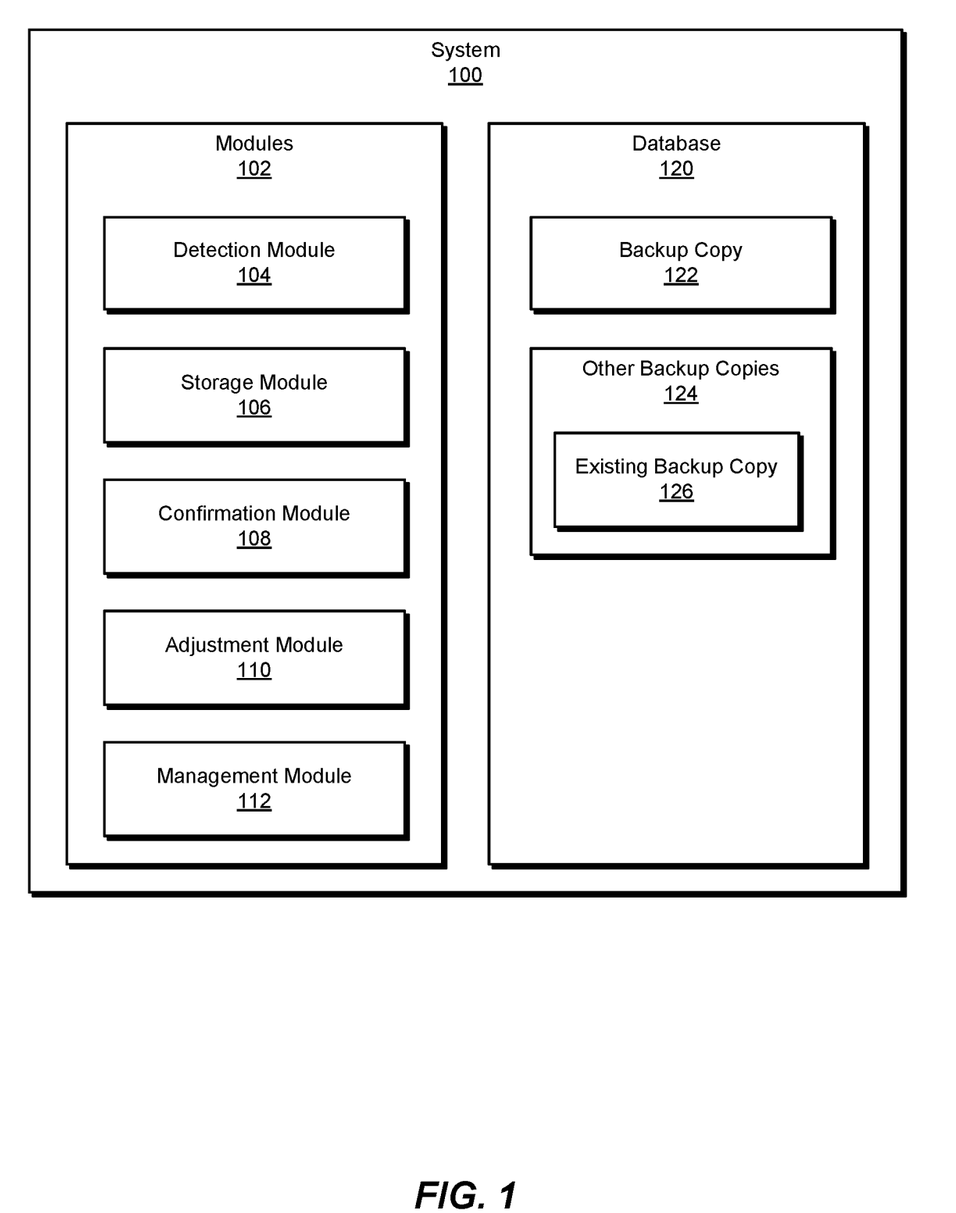
FIG. 1 is a block diagram of an exemplary system for modifying file backups in response to detecting potential ransomware.
Figure 2:
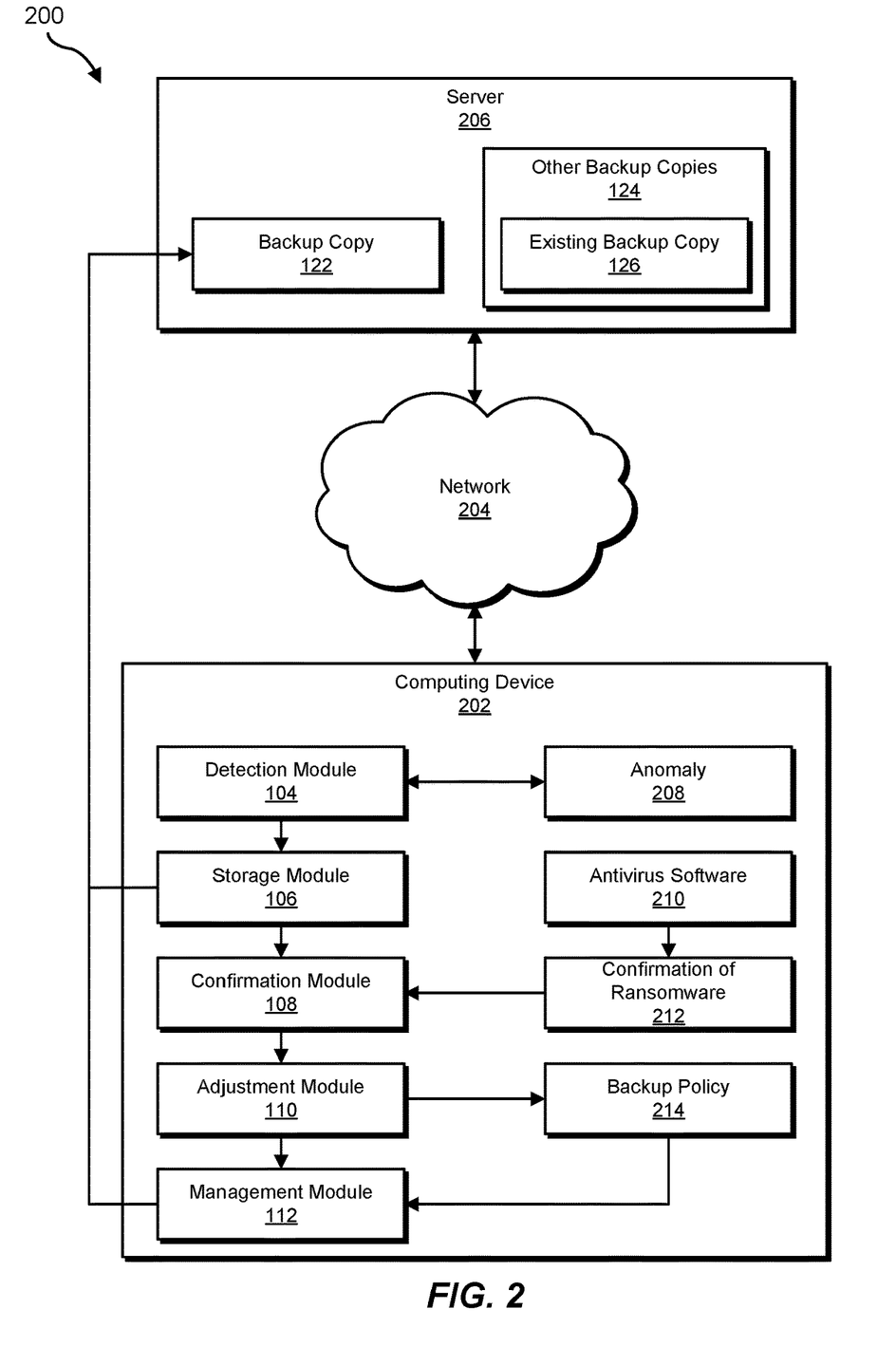
FIG. 2 is a block diagram of an additional exemplary system for modifying file backups in response to detecting potential ransomware.

The following will provide, with reference to FIGS. 1 and 2, detailed descriptions of exemplary systems for modifying file backups in response to detecting potential ransomware. Detailed descriptions of corresponding computer-implemented methods will also be provided in connection with FIG. 3. In addition, detailed descriptions of an exemplary detection of an exemplary anomaly detected during a file backup process will be provided in connection with FIG. 4. Furthermore, detailed descriptions of an exemplary adjustment of an exemplary backup policy to manage backup copies will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of exemplary system 100 for modifying file backups in response to detecting potential ransomware. The term "ransomware," as used herein, generally refers to malware, or malicious software, designed to restrict access to a computer file or component while demanding a ransom to restore access. Examples of ransomware may include, without limitation, cryptoviral extortion, encryption programs, scareware Trojans, or any other form of malware that requests payment from a user to remove a restriction created by the malware.

As illustrated in FIG. 1, exemplary system 100 may include one or more modules 102 for performing one or more tasks. For example, and as will be explained in greater detail below, exemplary system 100 may include a detection module 104 that may detect, during a file backup process, an anomaly that may be potentially indicative of ransomware on a computing device. Exemplary system 100 may also include a storage module 106 that, in response to detecting the anomaly that is potentially indicative of ransomware, may store a backup copy in a separate location from other backup copies. Exemplary system 100 may additionally include a confirmation module 108 that may confirm that the anomaly may be indicative of ransomware on the computing device. Furthermore, exemplary system 100 may include an adjustment module 110 that may adjust a backup policy in response to confirming that the anomaly may be indicative of ransomware on the computing device. The term "backup policy," as used herein, generally refers to a set of rules to manage a file backup process and the storage of backup copies of files.

Finally, exemplary system 100 may include a management module 112 that may manage the backup copy based on the adjusted backup policy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a backup copy 122 and/or other backup copies 124, which may include an existing backup copy 126, that contain copies of files on a computing device (e.g., computing device 202). Database 120 may also be configured to store backup policies, such as backup policy 214, which may manage file backup processes.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to prevent ransomware from affecting file backup copies. For example, and as will be described in greater detail below, detection module 104 may detect, during a file backup process, an anomaly 208 that is potentially indicative of ransomware on computing device 202. In response, storage module 106 may store backup copy 122 in a separate location from other backup copies 124. Confirmation module 108 may then confirm that anomaly 208 is indicative of ransomware on computing device 202. Adjustment module 110 may then adjust a backup policy 214 in response to confirming that anomaly 208 is indicative of ransomware on computing device 202. Finally, management module 112 may manage backup copy 122 based on adjusted backup policy 214.

In the example of FIG. 2, and as will be explained in greater detail below, computing device 202 may first detect anomaly 208 and store backup copy 122 separately from other backup copies 124 on server 206, via network 204, to prevent overwriting existing backup copy 126. Computing device 202 may then receive a confirmation of ransomware 212 from antivirus software 210. Next, computing device 202 may adjust backup policy 214 based on confirmation of ransomware 212. Finally, computing device 202 may command server 206 to manage backup copy 122 based on the newly adjusted backup policy 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing and/or managing backup copies of files. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
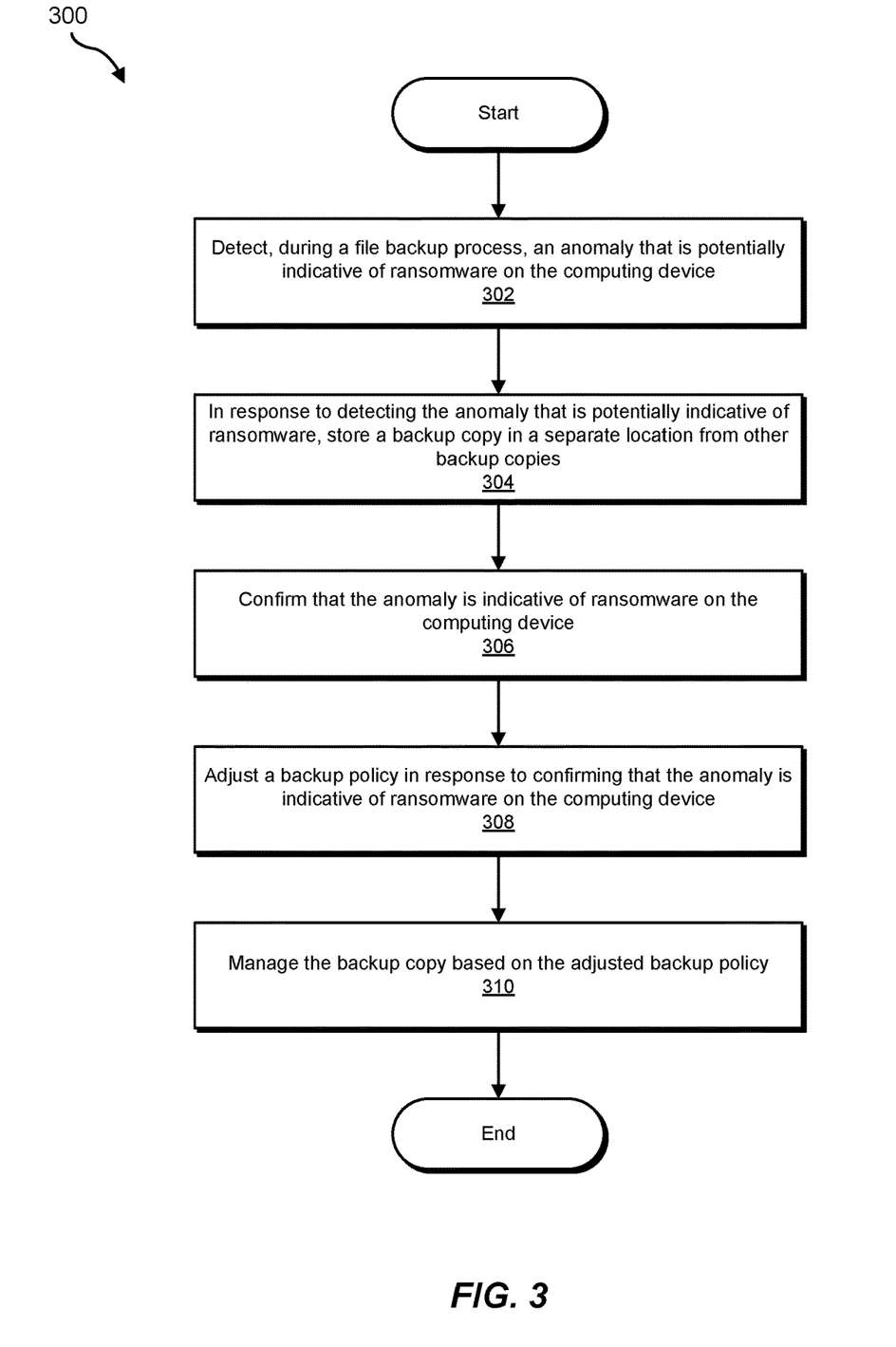
FIG. 3 is a flow diagram of an exemplary method for modifying file backups in response to detecting potential ransomware.

FIG. 3 is a flow diagram of an exemplary computer-implemented method 300 for modifying file backups in response to detecting potential ransomware. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may detect, during a file backup process, an anomaly that is potentially indicative of ransomware on a computing device. For example, detection module 104 may, as part of computing device 202 in FIG. 2, detect, during a file backup process, an anomaly 208 that is potentially indicative of ransomware on computing device 202.

Detection module 104 may detect anomaly 208 in a variety of ways. In some examples, detection module 104 may detect anomaly 208 by determining that the content of at least one file in the file backup process is anomalous. In these examples, determining that the content of the file is anomalous may include determining that the content of the file does not match the file's type, determining that the file's header does not match the file's type, and/or determining that the file's entropy is higher than expected. The term "file entropy," as used herein, generally refers to a measure of randomness of the data values within a file. In particular, encrypted files may seem more random and have a higher value of file entropy than unencrypted versions of the files.

Figure 4:
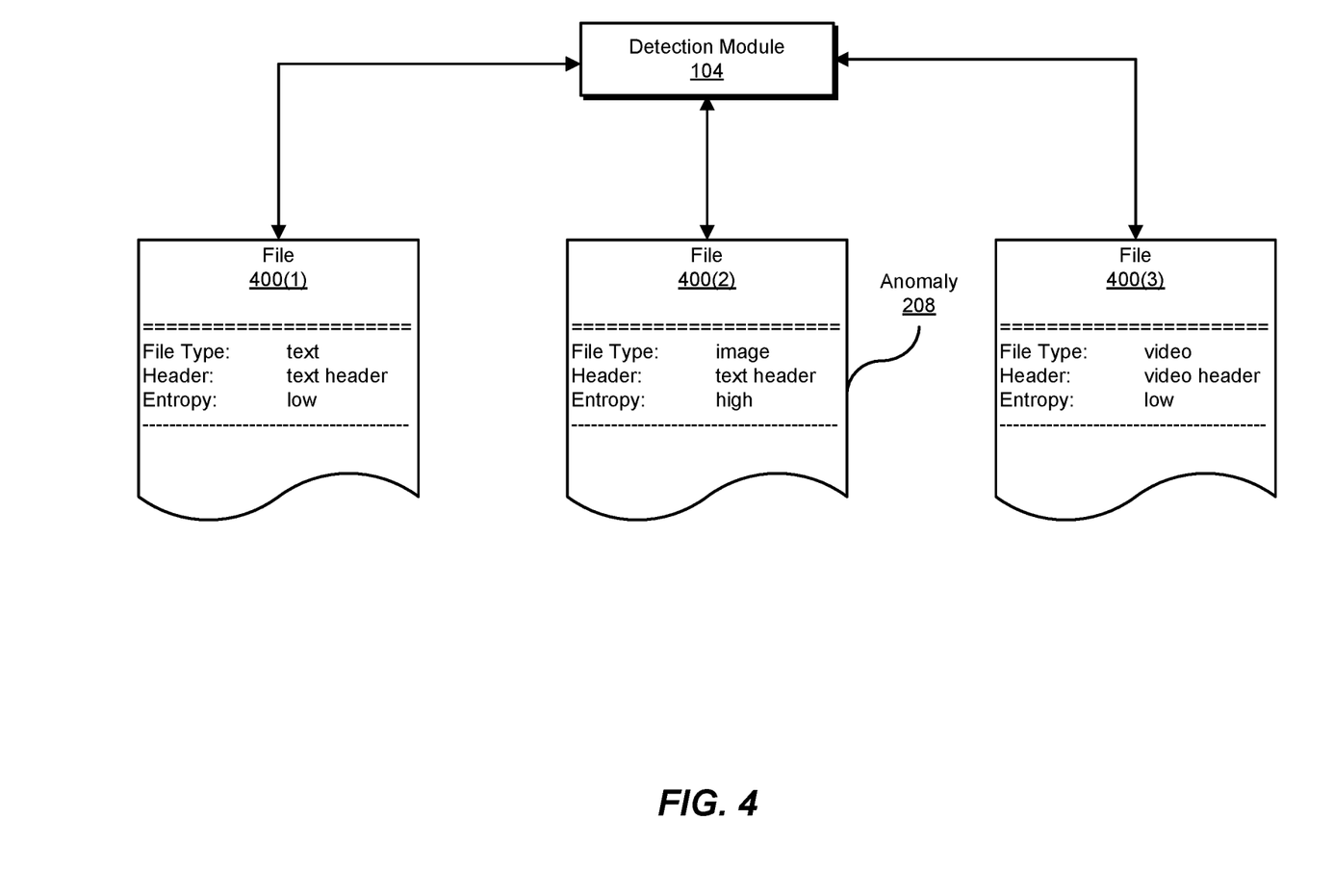
FIG. 4 is a block diagram of an exemplary detection of an exemplary anomaly detected during a file backup process.

For example, as shown in FIG. 4, detection module 104 may detect information about a file 400(1), a file 400(2), and a file 400(3) during the file backup process. In this example, file 400(2) may have a file header (e.g., "text header") that does not match the file's type (e.g., "image"). In addition, file 400(2) may have a high file entropy value. Thus, detection module 104 may detect anomaly 208 based on the anomalous content of file 400(2).

In other examples, detection module 104 may detect anomaly 208 by detecting an anomalous file-modification process on computing device 202. In these examples, detecting the anomalous file-modification process may include determining that the usage of a resource by the file-modification process exceeds a predetermined threshold and/or determining that the number of files accessed by the file-modification process is anomalous. For example, detection module 104 may detect an anomalously high consumption of processing power used to open certain types of files susceptible to ransomware attacks. In another example, a large number of files modified within a short time period may also indicate a ransomware attack. Anomalous usage of resources or access of files may be determined by a standard threshold or a learned value based on normal usage and known cases of ransomware attacks.

Returning to FIG. 3, at step 304, one or more of the systems described herein may, in response to detecting the anomaly that is potentially indicative of ransomware, store a backup copy in a separate location from other backup copies. For example, storage module 106 may, as part of computing device 202 in FIG. 2, in response to detecting anomaly 208, store backup copy 122 in a separate location from other backup copies 124.

Storage module 106 may store backup copy 122 in a variety of ways. In one embodiment, storage module 106 may store backup copy 122 in the separate location by preventing backup copy 122 from replacing existing backup copy 126 in other backup copies 124. In the example of FIG. 2, backup copy 122 may be an additional copy of the same file as existing backup copy 126, stored separately on server 206. The separate location may include a separate cloud storage location, a partitioned storage, or a separate server. In addition, backup copy 122 may be temporarily stored on computing device 202 or other connected storage devices.

Returning to FIG. 3, at step 306, one or more of the systems described herein may confirm that the anomaly is indicative of ransomware on the computing device. For example, confirmation module 108 may, as part of computing device 202 in FIG. 2, confirm that anomaly 208 is indicative of ransomware on computing device 202.

Confirmation module 108 may confirm that anomaly 208 is indicative of ransomware in a variety of ways. In some examples, confirmation module 108 may identify ransomware on computing device 202. In the example of FIG. 2, confirmation module 108 may receive confirmation of ransomware 212 from antivirus software 210 installed on computing device 202. In this example, antivirus software 210 may identify the ransomware on computing device 202 and send information about the ransomware to confirmation module 108. In other examples, confirmation module 108 may receive confirmation of ransomware 212 from a user of computing device 202.

In additional examples, confirmation module 108 may detect a ransomware attack on another computing device within the proximity of computing device 202. In these examples, the proximity of computing device 202 may include a physical proximity to computing device 202 and/or a logical grouping of computing device 202 and the other computing device. For example, the other computing device may be located within the same building as computing device 202 or connected to the same network, such as network 204. In another example, the other computing device may be part of the same organization as computing device 202. In these examples, the confirmed ransomware attack on the other computing device may indicate a vulnerability to ransomware on computing device 202. Confirmation module 108 may then receive confirmation of ransomware on the other computing device and determine anomaly 208 to be indicative of ransomware on computing device 202.

Returning to FIG. 3, at step 308, one or more of the systems described herein may adjust a backup policy in response to confirming that the anomaly is indicative of ransomware on the computing device. For example, adjustment module 110 may, as part of computing device 202 in FIG. 2, adjust backup policy 214 in response to confirming that anomaly 208 is indicative of ransomware on computing device 202.

Adjustment module 110 may adjust backup policy 214 in a variety of ways. In one embodiment, adjustment module 110 may quarantine at least one file in the file backup process, terminate the file backup process, adjust a frequency of the file backup process, adjust a number of backup copies to retain, and/or adjust a list of files to backup. In this embodiment, the backup process may proceed to more frequently backup unencrypted copies due to suspected ransomware on computing device 202 or confirmation of ransomware on the other computing device. The frequency of the file backup process may also include a speed at which the backup process is completed and/or a complete stop until the suspected ransomware is resolved. Additionally, for example, adjustment module 110 may adjust the list of files in backup policy 214 to exclude a type of file that the suspected ransomware targets or specific files that may be at risk.

Figure 5:
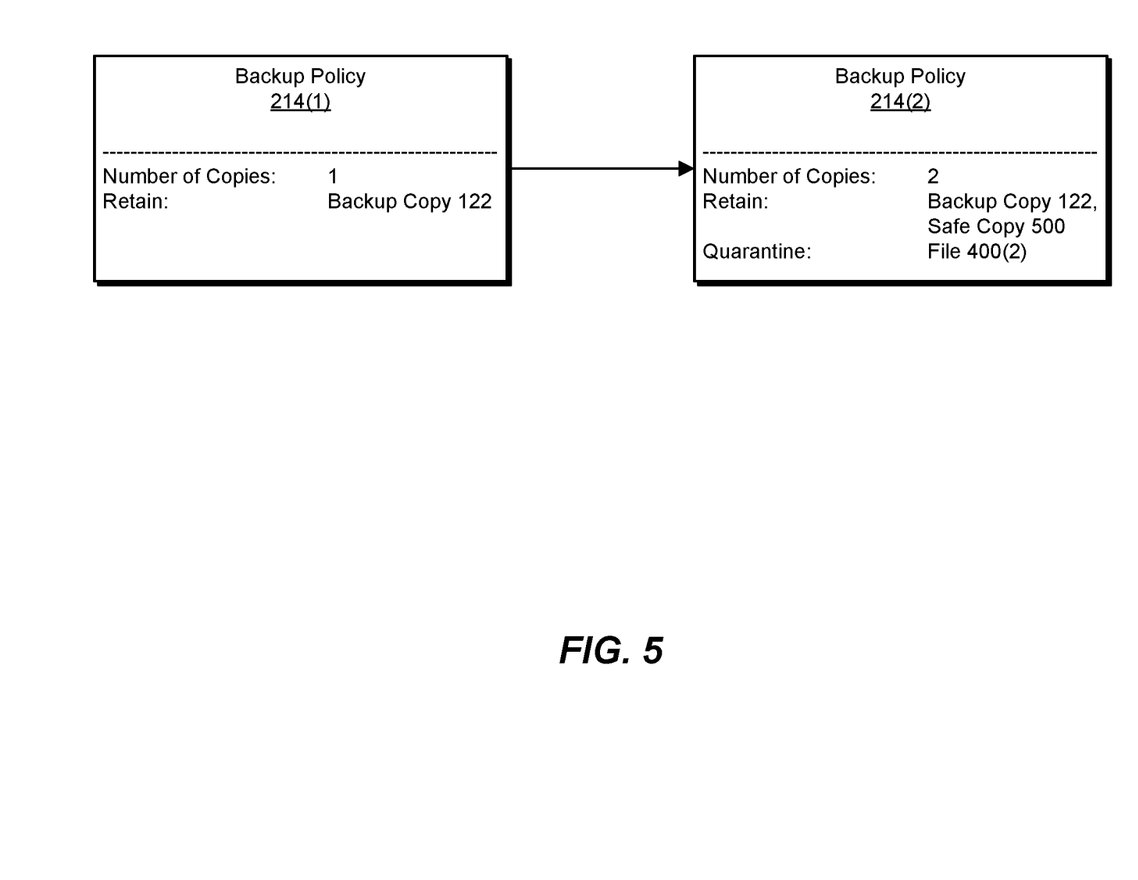
FIG. 5 is a block diagram of an exemplary adjustment of an exemplary backup policy to manage backup copies.

For example, as shown in FIG. 5, a backup policy 214(1) may specify a number of copies to retain (e.g., 1) and a specific backup copy to retain (e.g., backup copy 122). Adjustment module 110 may then adjust backup policy 214(1) to create a backup policy 214(2) that modifies the number of copies to retain (e.g., 2) and the backup copies to retain (e.g., backup copy 122, safe copy 500). Furthermore, adjustment module 110 may quarantine file 400(2) that contains anomaly 208, as shown in FIG. 4.

Returning to FIG. 3, at step 310, one or more of the systems described herein may manage the backup copy based on the adjusted backup policy. For example, management module 112 may, as part of computing device 202 in FIG. 2, manage backup copy 122 based on adjusted backup policy 214.

Management module 112 may manage backup copy 122 in a variety of ways. In some examples, management module 112 may discard backup copy 122, retain a safe backup copy, and/or replace backup copy 122 with the safe backup copy. In the example of FIG. 5, adjusted backup policy 214(2) may retain both backup copy 122 and a safe copy 500. In other examples, adjusted backup policy 214 may discard backup copy 122 based on confirmation of ransomware 212 in FIG. 2. Safe copy 500 may include a previous backup copy unaffected by ransomware, such as existing backup copy 126. Computing device 202 may additionally use safe copy 500 to recover the encrypted file, such as file 400(2) in FIG. 4.

In some embodiments, one or more of the systems described herein may disconfirm that anomaly 208 is indicative of ransomware on computing device 202 and merge backup copy 122 with other backup copies 124. In these embodiments, the file backup process may continue normally to store backup copy 122 with other backup copies 124. Backup copy 122 may then safely replace existing backup copy 126 or an alternate backup copy of the same file. Additionally, backup policy 214 may revert to its original version and continue to manage the file backup process. Furthermore, the predefined thresholds used to detect anomalies may be adjusted based on the confirmation or disconfirmation of ransomware.

As explained above in connection with method 300 in FIG. 3, the disclosed systems and methods may, by detecting anomalies that may indicate potential ransomware attacks during a file backup process, prevent encrypted backup copies affected by ransomware from replacing unencrypted backup copies. Specifically, the disclosed systems and methods may first analyze files in the backup process to detect anomalous content. For example, files with high file entropy values may indicate potential encryption by ransomware. The disclosed systems and methods may then prevent potentially encrypted files from being backed up pending confirmation of the attack. The disclosed systems and methods may then store backup copies separately from previous backup copies and modify a backup policy to account for the additional storage. Upon confirmation of ransomware, the systems and methods described herein may discard the affected backup copies and revert to previous safe backup copies. Thus, the disclosed systems and methods may allow a user to recover encrypted files using unencrypted backup copies.

As detailed above, by evaluating files during file backup, the disclosed systems and methods may detect anomalies that indicate a ransomware attack. In addition, by adjusting a backup policy based on suspicion of ransomware, the disclosed systems and methods may be able to prevent backup copies of encrypted files from overwriting previous unencrypted versions of the files that may be used in recovery. Thus, the systems and methods described herein may provide better management of backup copies to recover from ransomware attacks.

Figure 6:
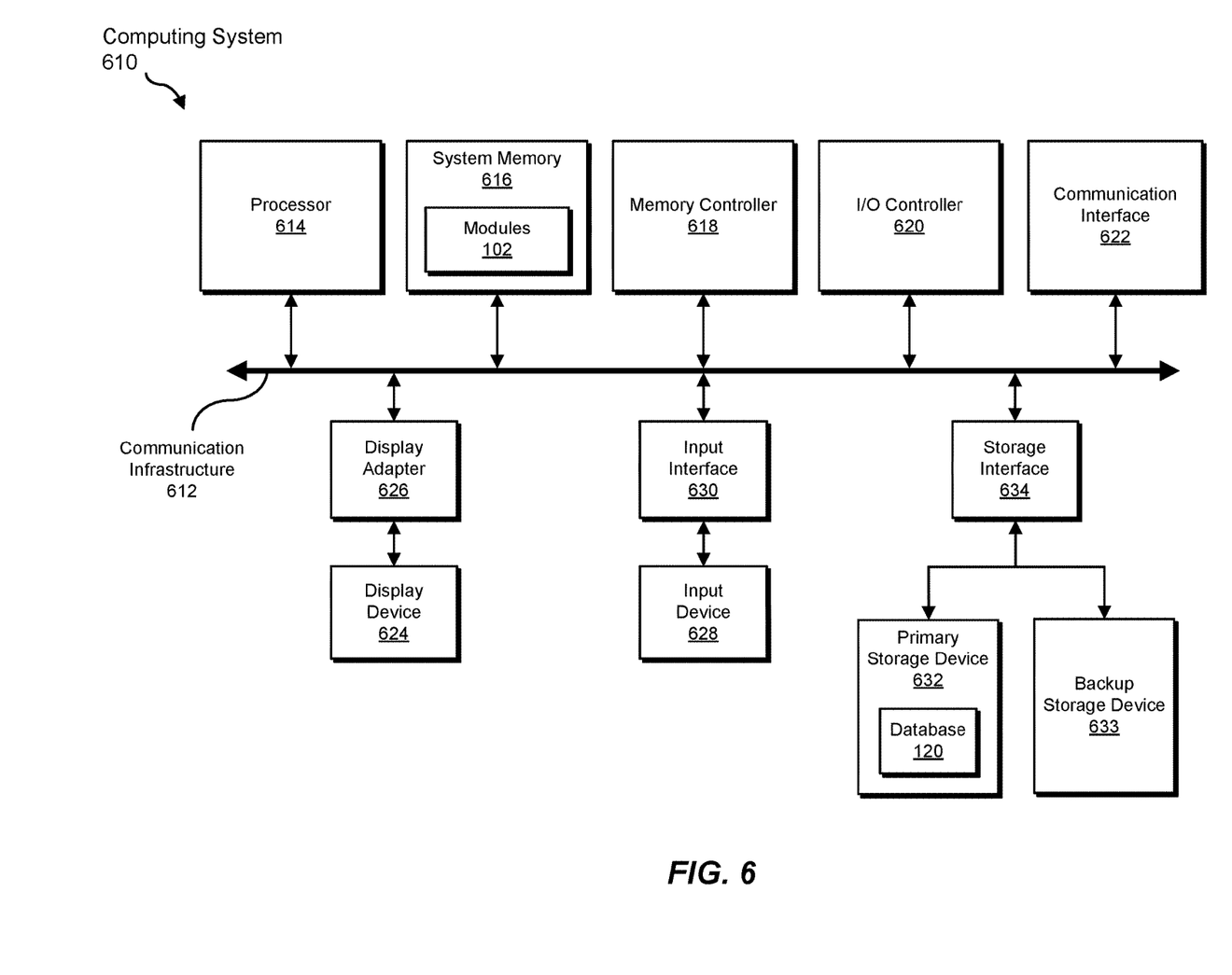
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
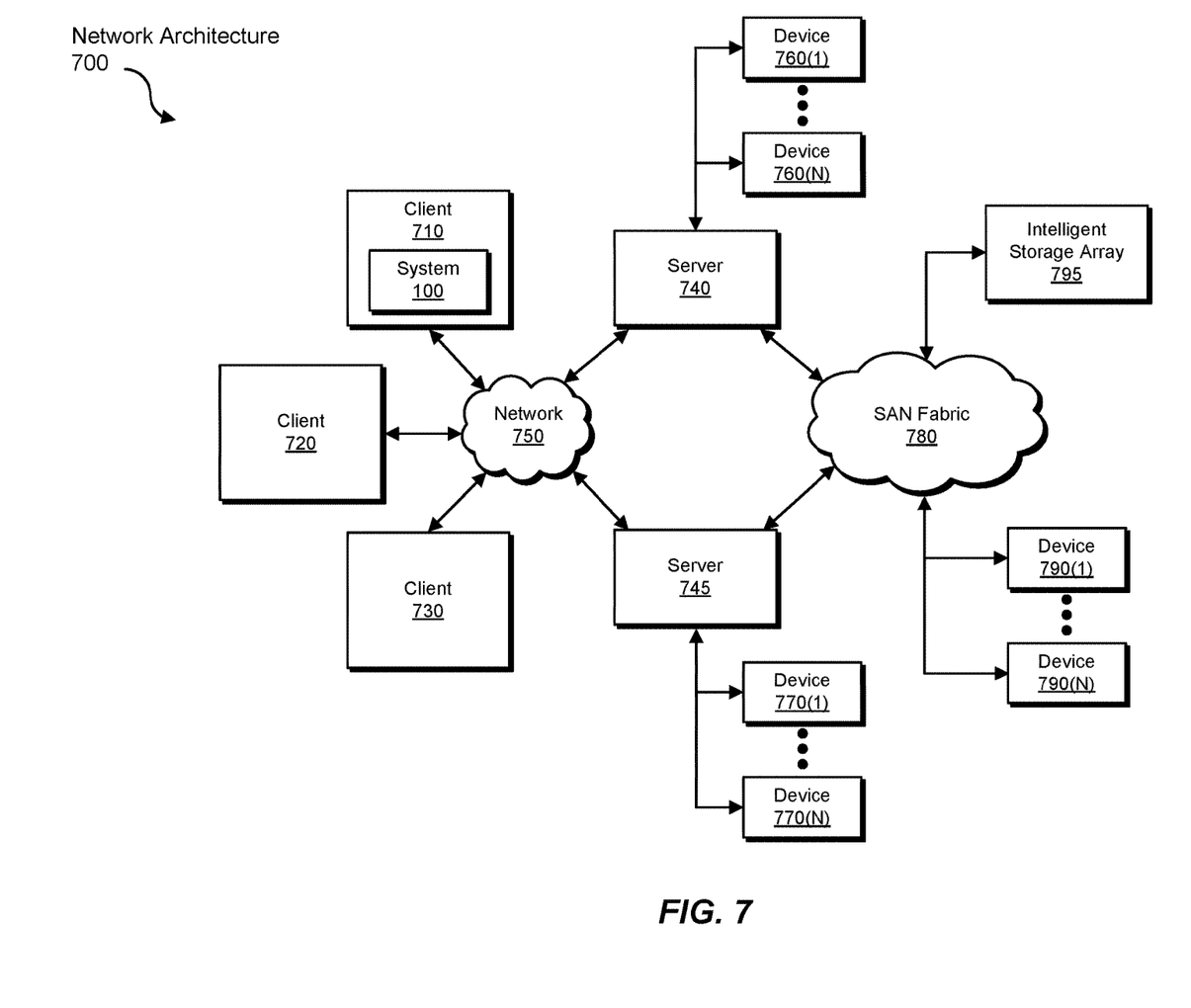
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for modifying file backups in response to detecting potential ransomware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a backup policy to be transformed, transform the backup policy, output a result of the transformation to a storage or output device, use the result of the transformation to manage a backup copy of a file, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for modifying file backups in response to detecting potential ransomware, at least a portion of the method being performed by a computing device comprising at least one processor, the method comprising:
    detecting, by the computing device analyzing a list of files to backup during a file backup process, an anomaly that is potentially indicative of ransomware on the computing device based on determining that anomalous content of at least one file in the list of files to backup indicates the file is potentially already encrypted by ransomware;
    in response to detecting the anomaly that is potentially indicative of ransomware, storing a backup copy of the file suspected of having been encrypted in a separate location from other backup copies;
    confirming, by the computing device, that the anomaly is indicative of ransomware on the computing device;
    adjusting, by the computing device, a backup policy in response to confirming that the anomaly is indicative of ransomware on the computing device, wherein the adjusted backup policy adjusts a rule specifying a number of backup copies of the file to retain; and
    managing, by the computing device, the suspect backup copy to prevent the suspect backup copy from replacing an unencrypted backup copy of the file based on the adjusted backup policy.

2. The method of claim 1, wherein detecting the anomaly that is potentially indicative of ransomware on the computing device comprises at least one of:
    determining that content of the file in the file backup process is anomalous; and
    detecting an anomalous file-modification process on the computing device.

3. The method of claim 2, wherein determining that the content of the file is anomalous comprises at least one of:
    determining that the content of the file does not match the file's type;
    determining that the file's header does not match the file's type; and
    determining that the file's entropy is higher than expected.

4. The method of claim 2, wherein detecting the anomalous file-modification process comprises at least one of:
    determining that a usage of a resource by the file-modification process exceeds a predetermined threshold; and
    determining that a number of files accessed by the file-modification process is anomalous.

5. The method of claim 1, wherein storing the suspect backup copy in the separate location comprises preventing the suspect backup copy from replacing an existing backup copy of the file in the other backup copies.

6. The method of claim 1, wherein confirming that the anomaly is indicative of ransomware on the computing device comprises at least one of:
identifying ransomware on the computing device;
receiving a confirmation of ransomware from antivirus software installed on the computing device;
receiving the confirmation of ransomware from a user of the computing device; and
detecting a ransomware attack on another computing device within a proximity of the computing device.

7. The method of claim 6, wherein the proximity of the computing device comprises at least one of:
a physical proximity to the computing device; and
a logical grouping of the computing device and the other computing device.

8. The method of claim 1, wherein adjusting the backup policy comprises at least one of:
quarantining the file in the file backup process;
terminating the file backup process;
adjusting a frequency of the file backup process; and
adjusting the list of files to backup.

9. The method of claim 1, wherein managing the suspect backup copy based on the adjusted backup policy comprises:
discarding the suspect backup copy;
retaining a safe backup copy of the file; and
replacing the suspect backup copy with the safe backup copy.

10. The method of claim 1, further comprising:
disconfirming that the anomaly is indicative of ransomware on the computing device; and
merging the suspect backup copy with the other backup copies.

11. A system for modifying file backups in response to detecting potential ransomware, the system comprising:
a detection module, stored in memory, that detects, by analyzing a list of files to backup during a file backup process, an anomaly that is potentially indicative of ransomware on a computing device based on determining that anomalous content of at least one file in the list of files to backup indicates the file is potentially already encrypted by ransomware;
a storage module, stored in memory, that, in response to detecting the anomaly that is potentially indicative of ransomware, stores a backup copy of the file suspected of having been encrypted in a separate location from other backup copies;
a confirmation module, stored in memory, that confirms that the anomaly is indicative of ransomware on the computing device;
an adjustment module, stored in memory, that adjusts a backup policy in response to confirming that the anomaly is indicative of ransomware on the computing device, wherein the adjusted backup policy adjusts a rule specifying a number of backup copies of the file to retain;
a management module, stored in memory, that manages the suspect backup copy to prevent the suspect backup copy from replacing an unencrypted backup copy of the file based on the adjusted backup policy; and
at least one hardware processor that executes the detection module, the storage module, the confirmation module, the adjustment module, and the management module.

12. The system of claim 11, wherein the detection module detects the anomaly that is potentially indicative of ransomware on the computing device by at least one of:
determining that content of the file in the file backup process is anomalous; and
detecting an anomalous file-modification process on the computing device.

13. The system of claim 12, wherein determining that the content of the file is anomalous comprises at least one of:
determining that the content of the file does not match the file's type;
determining that the file's header does not match the file's type; and
determining that the file's entropy is higher than expected.

14. The system of claim 12, wherein detecting the anomalous file-modification process comprises at least one of:
determining that a usage of a resource by the file-modification process exceeds a predetermined threshold; and
determining that a number of files accessed by the file-modification process is anomalous.

15. The system of claim 11, wherein the storage module stores the suspect backup copy in the separate location by preventing the suspect backup copy from replacing an existing backup copy of the file in the other backup copies.

16. The system of claim 11, wherein the confirmation module confirms that the anomaly is indicative of ransomware on the computing device by at least one of:
identifying ransomware on the computing device;
receiving a confirmation of ransomware from antivirus software installed on the computing device;
receiving the confirmation of ransomware from a user of the computing device; and
detecting a ransomware attack on another computing device within a proximity of the computing device.

17. The system of claim 16, wherein the proximity of the computing device comprises at least one of:
a physical proximity to the computing device; and
a logical grouping of the computing device and the other computing device.

18. The system of claim 11, wherein the adjustment module adjusts the backup policy by at least one of:
quarantining the file in the file backup process;
terminating the file backup process;
adjusting a frequency of the file backup process; and
adjusting the list of files to backup.

19. The system of claim 11, wherein the management module manages the suspect backup copy based on the adjusted backup policy by:
discarding the suspect backup copy;
retaining a safe backup copy of the file; and
replacing the suspect backup copy with the safe backup copy.

20. A non-transitory computer-readable medium comprising one or more computer-executable instructions that, when executed by at least one processor of a computing device, cause the computing device to:
detect, by analyzing a list of files to backup during a file backup process, an anomaly that is potentially indicative of ransomware on the computing device based on determining that anomalous content of at least one file in the list of files to backup indicates the file is potentially already encrypted by ransomware;
in response to detecting the anomaly that is potentially indicative of ransomware, store a backup copy of the file suspected of having been encrypted in a separate location from other backup copies;
confirm that the anomaly is indicative of ransomware on the computing device;

adjust a backup policy in response to confirming that the anomaly is indicative of ransomware on the computing device, wherein the adjusted backup policy adjusts a rule specifying a number of backup copies of the file to retain; and manage the suspect backup copy to prevent the suspect backup copy from replacing an unencrypted backup copy of the file based on the adjusted backup policy.

* * * * *